No. 780,155. Patented January 17, 1905.

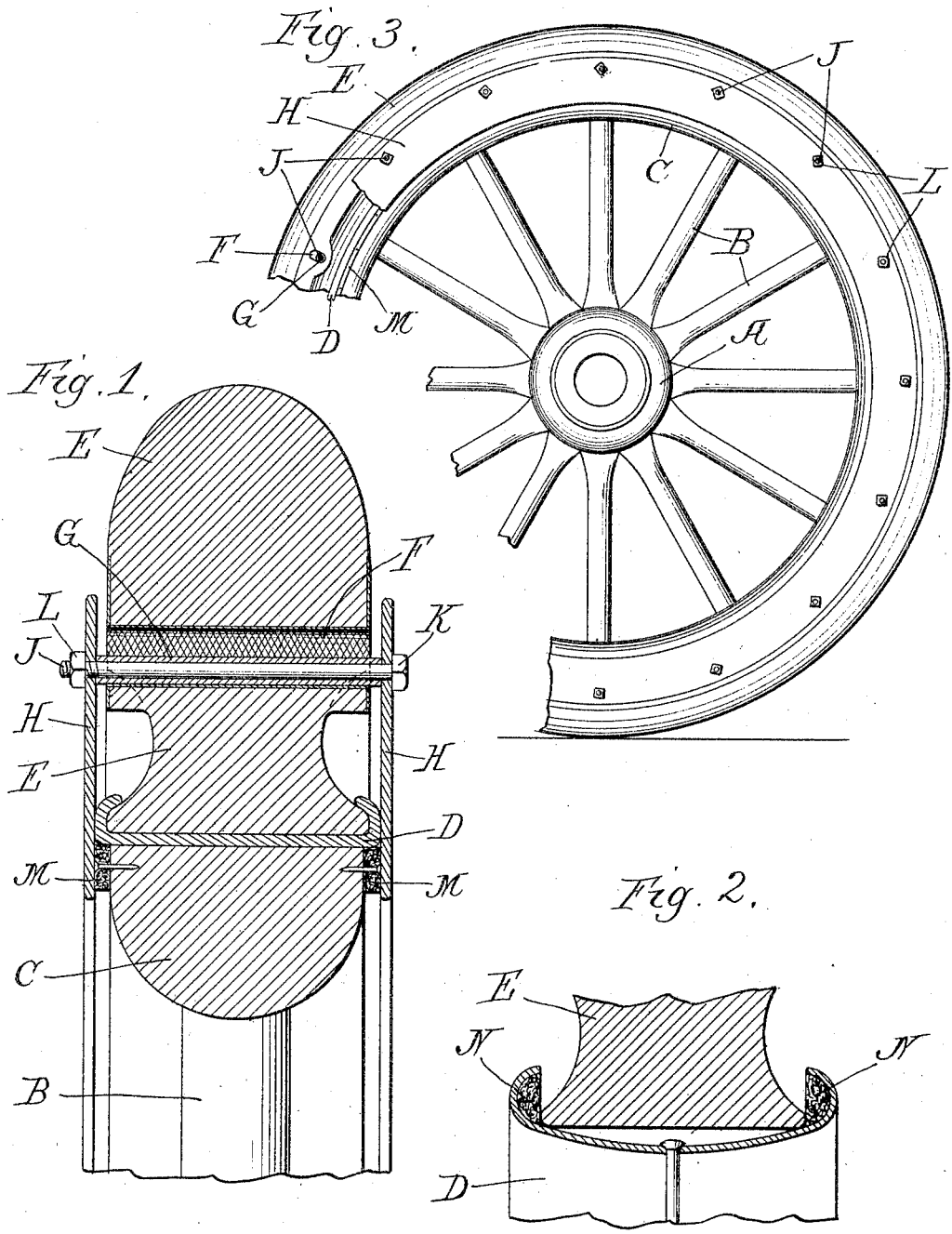

UNITED STATES PATENT OFFICE.

CLARENCE H. BRYAN, OF CHICAGO, ILLINOIS.

RUBBER TIRE.

SPECIFICATION forming part of Letters Patent No. 780,155, dated January 17, 1905.

Application filed October 10, 1904. Serial No. 227,801.

*To all whom it may concern:*

Be it known that I, CLARENCE H. BRYAN, a citizen of the United States, residing at Chicago, in the county of Cook and State of Illinois, have invented a certain new and useful Improvement in Rubber Tires, of which the following is a specification.

My invention relates to tires of rubber or other elastic material for vehicle-wheels, and has for its object to provide a new and improved construction for such devices.

Figure 1 is a cross-section through the tire containing my improvement; Fig. 2, a cross-section of a modification of the rim. Fig. 3 is a side view of a wheel with parts broken away.

Like parts are indicated by the same letters in all of the figures.

A represents the hub of the wheel; B, the spokes; C, the felly, of wood or other material; D, the rim, shaped in any of the forms suitable for the reception of pneumatic tires.

E is the tire, of rubber or other material, which may be shaped substantially as shown.

F F represent a series of holes through the tire, arranged so as to be in cross-section radially oblong. G G are sleeves which pass through these holes.

H H are rings, preferably of flat metal, and J J a series of bolts passing through the rings and through the sleeve and provided each with a head K and a nut L, whereby the two rings may be securely held together at the extremities of the series of bolts. On the inside of each of the rings is an annular cushion M.

The parts may be varied in size and proportion, and there may be varying lengths of sleeves, so as to vary the distance between the rings to adapt them to rims of different widths.

The pneumatic-tire rims in use are of greatly-varying forms, and to conveniently adapt my relatively solid tire to such rims I may have either sizes and shapes of solid rims suitable for these various pneumatic-tire rims, or I may employ means necessary to fill the rims so as to bring them to the shape suitable to receive some one of my standard-sized tires. In Fig. 1 I have shown a solid tire adapted to fill in the recesses of the rim. Fig. 2 illustrates the employment of means for filling in the recesses in the rim so as to permit the use of one of my standard-sized tires. N N are masses of such filling, and the same may consist of ratan hoops or rings sprung into the tire or other material convenient of application.

The use and operation of my invention will be obvious. I desire to fit my relatively solid rubber tires, each with its supporting-cage, to the ordinary pneumatic-tire wheel-rims with the least possible trouble and to provide a suitable cushion between the rim and the cage. This is accomplished as above set forth.

I claim—

1. In an elastic-tire device for vehicles the combination of an elastic tire with a rim having overhanging edges adapted to receive the inner surfaces of the tire and a cage having cross-rods extending through enlarged openings in the tire and rings which encircle and bear upon the tire and the rim.

2. In an elastic-tire device for vehicles, the combination of an elastic tire with a rim having overhanging edges and adapted to receive the inner surfaces of the tire, and a cage having cross-rods through the tire and rings which encircle and bear upon the tire and the rim.

3. The combination of an elastic tire with a supporting-cage, a rim with overhanging edges to receive the tire, and filling material in the cavities of the rim made by the overhanging edges.

CLARENCE H. BRYAN.

Witnesses:
 HOMER L. KRAFT,
 PERCIVAL H. TRUMAN,